L. M. DOUDNA.
Stove-Lid Holder.

No. 88,777.           Patented April 13, 1869.

Witnesses:

Inventor:

LINDLEY M. DOUDNA, OF WASHINGTON, DISTRICT OF COLUMBIA.

Letters Patent No. 88,777, dated April 13, 1869.

HOLDER FOR STOVE-LIDS.

The Schedule referred to in these Letters Patent and making part of the same.

*To all whom it may concern:*

Be it known that I, LINDLEY M. DOUDNA, of Washington, District of Columbia, have invented a new and improved Holder for Stove-Lids and Hooks, of which the following is a full, clear, and exact description, reference being had to the accompanying drawings, making a part of this specification, in which—

Figure 1:
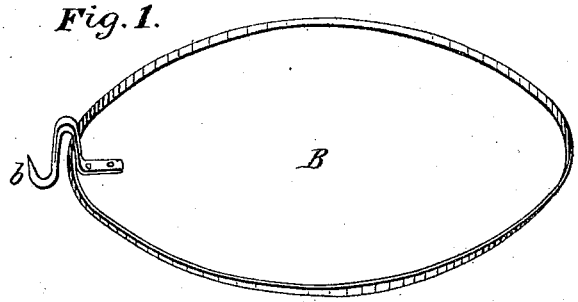
Figure 2:
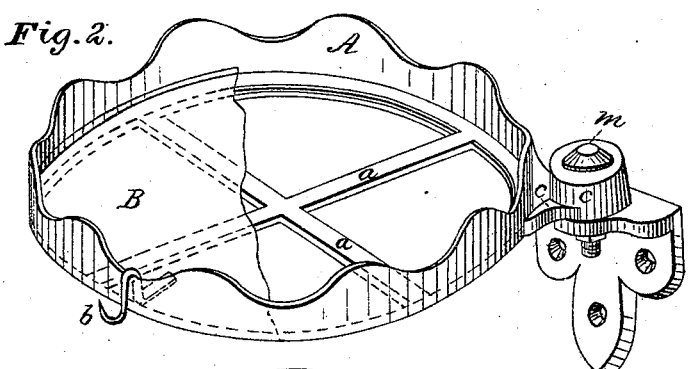
Figure 3:
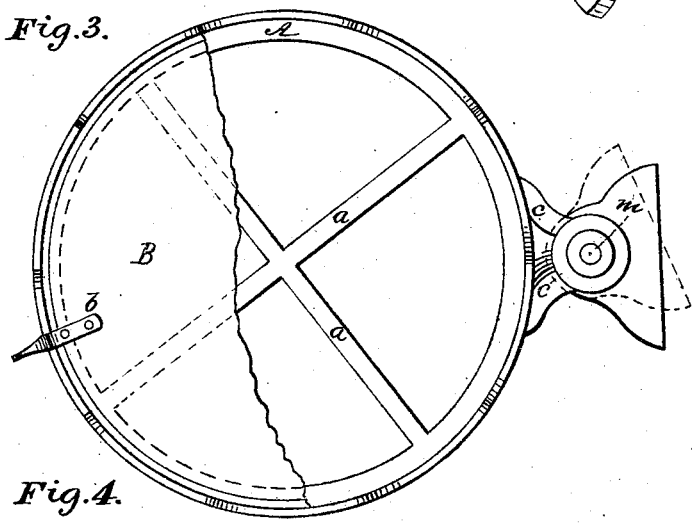
Figure 4:
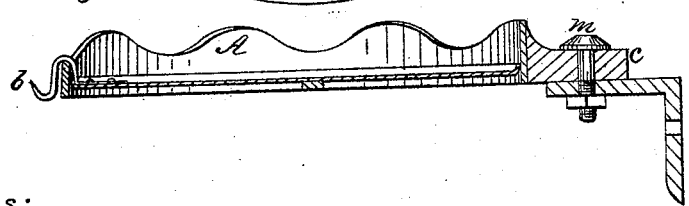

Figure 1 is a view of the removable bottom.
Figure 2 is a perspective view of the holder.
Figure 3 is a top view of the holder.
Figure 4 is a sectional view of the same.

My invention has for its object to provide a ready and convenient means for holding the lids of cooking-stoves, when they have to be removed from their places, when either hot or cold.

The usual manner of shoving these back on the stove-plate is objectionable, as they are necessarily in the way of cooking-utensils, and the soot which may be collected on them is shaken off, and becomes liable to get into the food being cooked.

The bottom of my lid-holder can be conveniently lifted from the frame by the hook, or handle, and any soot, or ashes deposited thereon, can be safely and easily removed, without danger to the food.

The lid-holder is also convenient for holding plates, for the reception of cakes, which may be afterwards kept warm by simply turning the holder to a position over the stove. It can also be made useful in various other ways.

To enable others skilled in the art to make and use my invention, I will proceed to describe the manner in which I have carried it out.

In the said drawings, A is a substantial frame, of cast-iron, or other suitable material, secured, by the plate $c$ and bolt $m$, to the upper plate of the stove, so as to revolve easily thereon.

The holder may be secured, by means of the bracket, to the wall, or any other body, instead of the stove-plate.

B is a removable bottom, fitting in the frame A, and resting on the cross-bars $a\ a$.

Attached to the removable bottom is the hook, or handle $b$, by which it can be lifted easily from the frame A, when necessary to remove soot, or dust therefrom, the handle $b$ also serving as a hook on which to hang the lid-lifter.

I am aware that stove-lids have been pivoted to the top plate of the stove; but this I do not claim; also, shelves attached to or connected with the stove-pipe. These I do not claim.

What I claim as my invention, and desire to secure by Letters Patent, is—

The frame A, with its removable bottom B, cross-bars $a\ a$, plate $c$, and bolt $m$, all constructed and arranged substantially as and for the purpose set forth

L. M. DOUDNA.

Witnesses:
RICHD. K. EVANS,
A. H. EVANS.